Sept. 24, 1963
G. ALFIERI ETAL
3,104,742
SERVO CONTROL PNEUMATIC CLUTCH RELEASE APPARATUS WITH
GEAR CHANGE FOLLOW FOLLOW UP LINK VALVE
Filed March 17, 1960
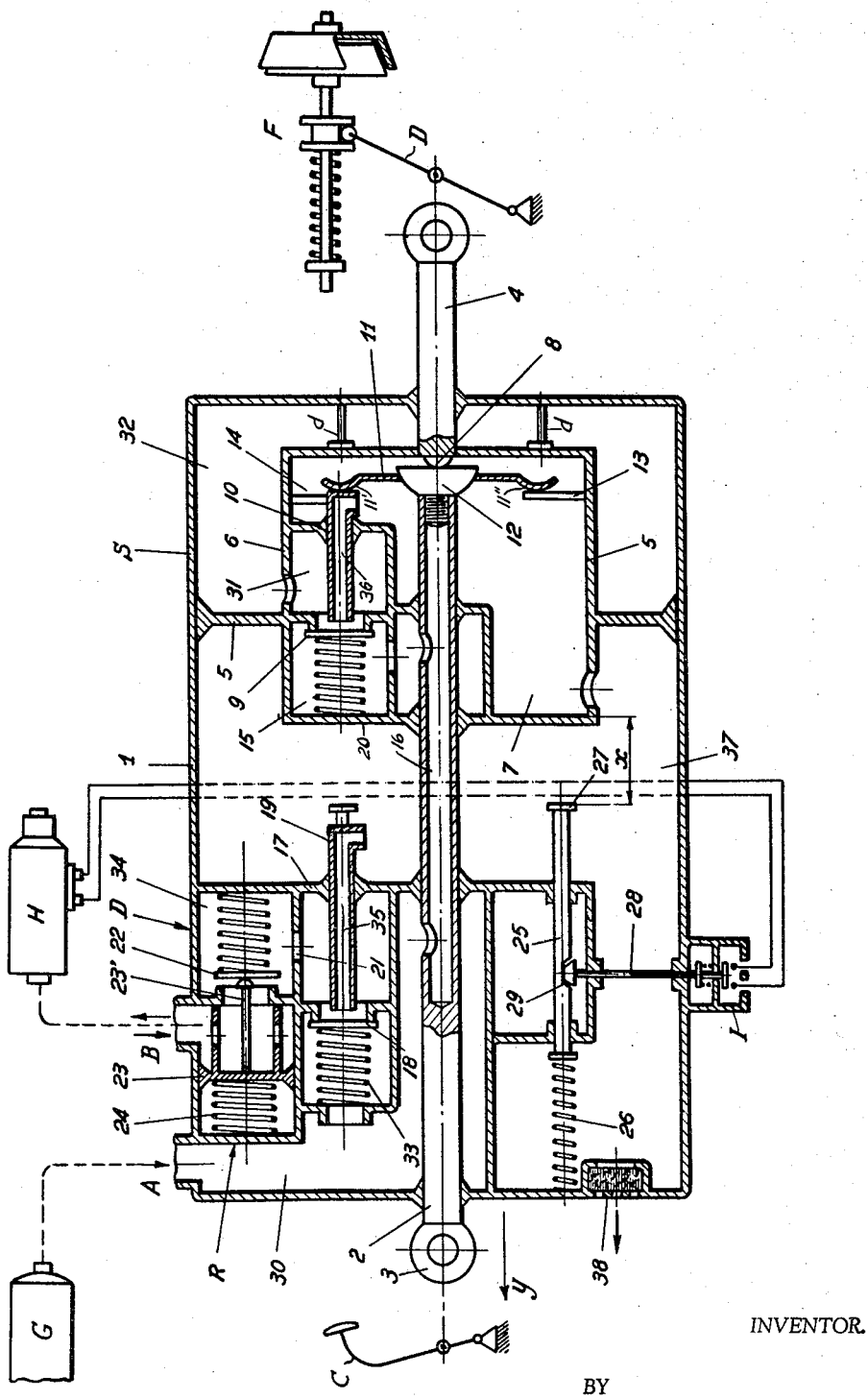
INVENTOR.
BY

United States Patent Office 3,104,742
Patented Sept. 24, 1963

3,104,742
SERVO CONTROL PNEUMATIC CLUTCH RELEASE APPARATUS WITH GEAR CHANGE FOLLOW UP LINK VALVE
Giuseppe Alfieri and Roberto Moriondo, Milan, Italy, assignors to Fabbrica Italiana Magneti Marelli S.p.A., Milan, Italy, a firm
Filed Mar. 17, 1960, Ser. No. 15,749
Claims priority, application Italy Mar. 26, 1959
13 Claims. (Cl. 192—3.5)

The present invention relates to a servo control pneumatic clutch release installation furnished with a gear change follow up link valve, and particularly suited to heavy vehicles.

It is commonly known that, in order to reduce the manual force exerted by the driver of a heavy vehicle, in order to execute certain control operations requiring considerable force, servo control devices are employed to supplement the manual effort of the driver, and thus render the accomplishment of the control operation much easier.

Said servo control devices are frequently employed for clutch release as well as gear speed changing.

In the case of heavy vehicles employing a compressed air system, these are of the pneumatic type, and are essentially constituted by an operating cylinder and an air distributor.

When, on the same vehicle, over and above the clutch pneumatic servo control, there is also a speed gear pneumatic servo control; it is necessary that actuation of the latter shall occur only after the clutch release. For this purpose an auxiliary distributor is normally employed to feed compressed air to the gear change servo control at the completion of the clutch release.

Further, it is frequently necessary to install a pressure reducer which limits the maximum pressure value of the gear change servo control, whenever lower pressure values are to be provided to the latter with respect to that of the maximum pressure of the installation storage tank.

An electric switch is also required for the excitation of the gear change electrovalves.

In the present state of technical development, the distributor with the servo clutch operating cylinder, the auxiliary distributor with servo control gear change reducer, and the gear change electrovalves switch, all constitute separate individual apparatus, and are mounted on the vehicle in various different positions.

This assemblage, besides being bulky, is rather complex because of the necessity for flexible connecting pipes, and mechanical joints for both the foot pedal and clutch tie rod linkages.

The above mentioned inconveniences are obviated by the adoption of the apparatus which is the subject of this invention, and which is characterised by having all the afore-mentioned parts installed in a housing, with a resulting simplification of both the mechanical and pneumatic connections. Further, the apparatus control system is such as to give a great sensitivity to the apparatus.

The body of the apparatus is rigidly fixed to the chassis, and the pneumatic connections are joined to same without the necessity of flexible tubing. Further, the mechanical links for the foot pedal tie rods and the clutch tie rods are located in the main axis of the apparatus from the two opposite sides, and arranged in such manner that, in the event of lack of air, they become rigidly engaged, and permit mechanical operation of the clutch.

The accompanying drawing, shows schematically an embodiment of the apparatus according to the invention.

In the housing 1 of the apparatus which is fixed to the chassis, a clutch disengaging servo control device S is mounted adjacent to the top end of the housing as viewed in the drawing, and mounted adjacent to the bottom end of the housing are a pressure servo control device R, and electric switch control device I for exciting the gear change electrovalves.

Operation of the clutch servo control is obtained by means of push rod 2 situated along the main axis of the apparatus, and having an extremity 3 connected to the tie rods (not shown in the drawing) of the clutch pedal C.

On the prolongation of control push rod 2, at the other extremity, is situated a second push rod 4 connected to the tie rods (not shown in the drawing) of a lever D which is connected to a friction clutch F.

The servo control S comprises a piston 5 connected to push rod 4 which slides airtightly in housing 1 and on push rod 2.

The piston carries on one side, a compressed air distributor 6, and on the other side there is a chamber 7, through which the air exhausts during the distribution disengaging phase. The piston 5 carries a stop 8 which acts against push rod 2, whilst the piston is held at a distance from an end of the housing by means of a spacer d.

The distributor 6 is essentially constituted by the inlet valve 9 and by the operating rod 10.

The control of the push rod is obtained by means of a portion 11' of balancing element 11 having an articulated joint formed with head 12 of push rod 2.

Another portion 11" of the balancing element rests on the piston stop arrrest 13 in such manner that during the activation phase, the balancing element on being centrally displaced can lever against the arrest stop, and control by means of component 11' the operating rod 10 of the distributor.

This particular construction of the control balance element increases the sensitivity of the apparatus, inasmuch as the run of the balance element of the control rod is only half of that required for the opening of the distributor. A stop 14 provided at the extension 11' of the distributor, and at a lower level than that of stop 13, allows for engagement between the balancing element 11 and the piston during manual operation of the apparatus.

Chamber 15 of the distributor receives the fluid feed through a passage 16 situated internally in push rod 2.

The auxiliary distributor D of the servo control speed gear change, not shown in the drawing, is comprised of a normal distributor 17 with inlet valve 18 and operating rod 19 controlled by end plate 20 of piston 5.

Alongside auxiliary distributor 17, and in communication with same by means of passage 21, is situated the pressure reducer R which is fixed to the housing of the apparatus. The reducer comprises a reducing valve 22 normally lifted from its seat by means of the piston rod 23' of a piston 23 operated by a calibrated spring 24.

The electric switch I is controlled by a rod 25 which slides parallel to rod 2 and is loaded at one side by a biasing spring 26, and at the other side 27 by the action of piston 5 end plate 20. The engagement between said rod and electric switch operating push rod 28 is realised by cam means formed by said rod at slot 29 and the adjacent push rod extremity.

The apparatus is pneumatically connected with the compressed air storage tank G at union A, and with the speed gear change servo control H at union B. In the drawing, which shows the apparatus in the rest or disengaged position, the compressed air flows through union A, chamber 30 and passage 16 to arrive at chamber 15 of distributor 6.

During working operations, the driver, when pressing on the the clutch foot pedal, determines the vertical displacement (as viewed in the drawing) of rod 2, which by means of balancing element 11 acts on distributor rod 10 which is pushed against valve 9 so as to shut off the exhaust and open the inlet.

The compressed air from chamber 15, and admitted by means of valve 9 to the chambers 31 and 32, acts on piston 5 which in conjunction with rod 2, moves downward as viewed in the drawing, and draws rod 4 connected to the clutch.

In such a manner, with each movement of the clutch pedal (of rod 2), a well determined displacement of piston 5 (of rod 4) occurs, and hence a perfectly graded and controlled movement of the clutch, whether during the engaging or disengaging phases.

Continuing with the control system: On completion of the disengaging operation after a given run of X; the baseplate 20 of the piston engages the push rod of auxiliary distributor 19, which moves against valve 18 to close the exhaust passage 35 and to open the valve 18. Compressed air from chamber 30 accordingly flows through chamber 33, the valve 18, passage 21, the chamber 34, reducing valve 22, and through union B to the gear change servo control H.

As already stated, the reducing valve 22 is normally open by means of the operation of spring 24 against which piston 23 acts. The load of spring 24 is calibrated in such manner, that at a given pressure imposed on the gear change servo control H, the pneumatic action on piston 23 overcomes the force of spring 24 thus determining the closure 22, and prohibiting any further increase in the output pressure.

Referring again to the end of the stroke of the servo clutch piston, and which has a certain anticipation with respect to the opening of the distributor feeding the gear change servo control; electro switch I becomes activated by means of control device (25—28), and operates the gear change electro valves. In this manner, the only time that the electrovalves become operative is during the clutch releasing phase.

When the clutch pedal is released, the distributor push rods 10 and 19 are liberated from the respective valves in such a manner that compressed air in the gear change servo control H can exhaust through union B, thence through valve 22, chamber 34, delivery pipe 35 of push rod 19, chamber 37, and outlet 38 to atmosphere.

Similarly, the air from the clutch servo control of chamber 32, flows through chamber 31, internal conduit 36 of push rod 10, chambers 7 and 37 to exhaust outlet 38 until clutch engagement is restored.

Whenever, for any reason, there is no available compressed air, it is always possible to obtain mechanical release of the clutch inasmuch as the balancing element 11, after the valve opening run of rod 10, engages itself with arrest stop 14 in such a manner that push rod 2 can drag the piston 5 and rod 4 connected to the clutch.

In this manner for example, the clutch servo control device and auxiliary distributor can be applied in adapting to servo control normal vehicles embodying normal gear changes without pneumatic servo controls.

We claim:

1. In an apparatus for introducing power actuation of a clutch having manually operable control means, the combination which includes, a housing, a piston having a chamber within said housing and slidable in said housing between positions respectively corresponding to an engaged position of the clutch and a disengaged position of the clutch, a piston rod movable with said piston and adapted to be connected with the clutch, a fluid distributor on said piston including a valve having an operating rod slidably on said piston, said valve having positions selectively for distributing fluid under pressure to said chamber to drive said piston from said position corresponding to the clutch engaged position to a position corresponding to the clutch disengaged position and for venting said chamber to atmosphere, said valve being biased by a spring to the venting position, a push rod adapted to be connected with the manually operable means for the clutch, a coupling connecting said push rod to move with said piston and tolerating limited movement of said push rod in opposite directions with respect to said piston, and means for selecting one and the other of the positions of said fluid distributor including a balancing element fulcrumed on said push rod and having portions respectively engaging said piston and said valve operating rod for said balancing element to move said valve to the position for distributing fluid under pressure to said chamber when said piston is to be driven by fluid pressure in said chamber toward the position corresponding to the disengaged position of the clutch.

2. Apparatus as set forth in claim 1, wherein said piston includes a stop for said portion of the balancing element corresponding to said valve operating rod, and said stop is effective when said valve is in the position for distributing fluid under pressure to said chamber for said piston to be operated by said push rod from said position of the piston corresponding to the engaged position of the clutch to the position of the piston corresponding to the clutch disengaged position.

3. In an apparatus for introducing power actuation of a clutch having manually operable control means, and for distributing fluid under pressure with respect to a gear change servo mechanism, the combination which includes, a housing, a piston having a chamber within said housing and slidable in said housing between positions respectively corresponding to an engaged position of the clutch and a disengaged position of the clutch, a piston rod movable with said piston and adapted to be connected with the clutch, a fluid distributor on said piston in said housing and having positions selectively for distributing fluid under pressure to said chamber to drive said piston from said position corresponding to the clutch engaged position to the position corresponding to the clutch disengaged position and for venting said chamber to atmosphere when the fluid pressure driving operation of said piston is to be terminated, a push rod adapted to be connected with the manually operable means for the clutch, a coupling connecting said push rod to move with said piston and tolerating limited movement of said push rod in opposite directions with respect to said piston, said coupling including means for selecting one and the other of said positions of the distributor respectively in accordance with one and the other of said opposite directions of movement of said push rod, and an auxiliary distributor having positions selectively for distributing fluid under pressure to the gear change servo mechanism and venting the fluid from the gear change servo mechanism to atmosphere, said auxiliary distributor having means operable in response to movement of said piston whereby said auxiliary distributor is in venting position when said piston is disposed to correspond to the clutch engaged position, and whereby said auxiliary distributor is actuated to position for distributing fluid under pressure to the gear change servo mechanism when said piston is disposed to correspond to the clutch disengaged position.

4. Apparatus as set forth in claim 3, wherein said auxiliary distributor includes a valve having an operating rod inside said housing, said valve being slidable for said valve selectively to distribute fluid under pressure to the gear change servo mechanism and for said valve to vent the fluid from the gear change servo mechanism to atmosphere, said valve having a spring biasing the same to the venting position and being forced to the fluid supplying position by means of said piston when the latter takes position corresponding to disengaged position of the clutch.

5. In an apparatus for introducing power actuation of a clutch having manually operable control means, and for distributing fluid under pressure with respect to a gear change servo mechanism associated with gear change electrovalves, the combination which includes, a housing, a piston having a chamber within said housing and slidable in said housing between positions respectively corresponding to an engaged position of the clutch and a disengaged position of the clutch, a piston rod movable with said piston and adapted to be connected with the clutch, a fluid distributor on said piston in said housing and having positions selectively for distributing fluid under pressure to said chamber to drive said piston from said position corresponding to the clutch engaged position to the position corresponding to the clutch disengaged position and for venting said chamber to atmosphere when the fluid pressure driving operation of said piston is to be terminated, a push rod adapted to be connected with the manually operable means for the clutch, a coupling connecting said push rod to move with said piston and tolerating limited movement of said push rod in opposite directions with respect to said piston, said coupling including means for selecting one and the other of said positions of the distributor respectively in accordance with one and the other of said opposite directions of movement of said push rod, an auxiliary distributor having positions selectively for distributing fluid under pressure to the gear change servo mechanism and venting the fluid from the gear change servo mechanism to atmosphere, said auxiliary distributor having means operable in response to movement of said piston whereby said auxiliary distributor is in venting position when said piston is disposed to correspond to the clutch engaged position and is actuated to position for distributing fluid under pressure to the gear change servo mechanism when said piston is disposed to correspond to the clutch disengaged position, and control means for the electrovalves having positions respectively corresponding to energization and lack of energization of the electrovalves and being so operable in response to movement of said piston that for said position of the piston corresponding to the clutch engaged position said control means for the electrovalves is in the position corresponding to lack of energization of the electrovalves and that in said position of said piston corresponding to the clutch disengaged position of said piston said control means for the electrovalves is in the position corresponding to energization of the electrovalves.

6. Apparatus as set forth in claim 5, wherein said control means for the electrovalves is actuated by said piston so that the electrovalves are energized when the clutch is in the disengaged position.

7. Apparatus as set forth in claim 5, wherein said control means includes a slide having a biasing spring and an electric switch having an operating rod following a cam on the slide, said slide being actuated by said piston so that the electrovalves are energized when the clutch is disengaged.

8. In an apparatus for introducing power actuation of a clutch having manually operable control means, and for distributing fluid under pressure with respect to a gear change servo mechanism, the combination which includes, a housing, a piston having a chamber within said housing and slidable in said housing between positions respectively corresponding to an engaged position of the clutch and a disengaged position of the clutch, a piston rod movable with said piston and adapted to be connected with the clutch, a fluid distributor on said piston in the housing and having positions selectively for distributing fluid under pressure to said chamber to drive said piston from said position corresponding to the clutch engaged position to the position corresponding to the clutch disengaged position and for venting said chamber to atmosphere when the fluid pressure driving operation of said piston is to be terminated, a push rod adapted to be connected with the manually operable means for the clutch, a coupling connecting said push rod to move with said piston and tolerating limited movement of said push rod in opposite directions with respect to said piston, said coupling including means for selecting one and the other of said positions of the distributor respectively in accordance with one and the other of said opposite directions of movement of said push rod, a pressure reducer, and an auxiliary distributor having positions selectively for distributing fluid under pressure to the gear change servo mechanism through said pressure reducer and venting the fluid from the gear change servo mechanism to atmosphere, said auxiliary distributor having means operable in response to movement of said piston whereby said auxiliary distributor is in venting position when said piston is disposed to correspond to the clutch engaged position, and whereby said auxiliary distributor is actuated to position for distributing fluid under pressure to the gear change servo mechanism when said piston is disposed to correspond to the clutch disengaged position.

9. In an apparatus for introducing power actuation of a clutch having manually operable control means, and for distributing fluid under pressure with respect to a gear change servo mechanism, the combination which includes, a housing, a piston having a chamber within said housing and slidable in said housing between positions respectively corresponding to an engaged position of the clutch and a disengaged position of the clutch, a piston rod movable with said piston and adapted to be connected with the clutch, a fluid distributor on said piston in the housing and having positions selectively for distributing fluid under pressure to said chamber to drive said piston from said position corresponding to the clutch engaged position to the position corresponding to the clutch disengaged position and for venting said chamber to atmosphere when the fluid pressure driving operation of said piston is to be terminated, a push rod adapted to be connected with the manually operable means for the clutch, a coupling connecting said push rod to move with said piston and tolerating limited movement of said push rod in opposite directions with respect to said piston, said coupling including means for selecting one and the other of said positions of the distributor respectively in accordance with one and the other of said opposite directions of movement of said push rod, an auxiliary distributor having positions selectively for distributing fluid under pressure to the gear change servo mechanism and venting the fluid from the gear change servo mechanism to atmosphere, said auxiliary distributor having means operable under thrust of said piston whereby said auxiliary distributor is disposed to the position for distributing fluid under pressure to the gear change servo mechanism when said piston is disposed to correspond to the clutch disengaged position.

10. In an apparatus for introducing power actuation of a clutch having manually operable control means, and for distributing fluid under pressure with respect to a gear change servo mechanism, the combination which includes, a housing, a piston having opposite ends in corresponding chambers within said housing and said piston being slidable in said housing between positions respectively corresponding to an engaged position of the clutch and a disengaged position of the clutch, one of said chambers being a pressure chamber and the other of said chambers being vented to atmosphere, a piston rod movable with said piston and adapted to be connected with the clutch, a distributing valve on said piston in said housing and having positions selectively for distributing fluid under pressure to said pressure chamber to drive said piston from said position corresponding to the clutch engaged position to the position corresponding to the clutch disengaged position and for venting said pressure chamber to atmosphere when the fluid pressure driving operation of said piston is to be terminated, a push rod coaxial with said piston and adapted to be connected with the manually operable means for the clutch, a coupling connecting said push rod to move with said piston and tolerating limited movement of said push rod in opposite directions with respect to said piston, said coupling including means for selecting one and the other of said positions of the valve respectively in accordance with one and the other of said opposite directions of movement of said push rod, an auxiliary distributing valve having positions selectively for distributing fluid under pressure to the gear change servo mechanism and venting the fluid from the gear change servo mechanism to atmosphere, said auxiliary valve being operable by said piston whereby said auxiliary distributing valve is in venting position when said piston is disposed to correspond to the clutch engaged position, and is actuated to position for distributing fluid under pressure to the gear change servo mechanism when said piston is disposed to correspond to the clutch disengaged position.

11. Apparatus as set forth in claim 3, wherein said fluid distributor on said piston includes a distributing valve having an operating rod slidably on said piston, said valve having positions selectively for distributing fluid under pressure to said chamber to drive said piston from said position corresponding to the clutch engaged position to a position corresponding to the clutch disengaged position and for venting said chamber to atmosphere, said valve being biased by a spring to the venting position, said means for selecting one and the other of the positions of said fluid distributor on the piston includes a balancing element fulcrumed on said push rod and having portions respectively engaging said piston and said valve operating rod for said balancing element to move said valve to the position for distributing fluid under pressure to said chamber when said piston is to be driven by fluid pressure in said chamber toward the position corresponding to the disengaged position of the clutch, and said auxiliary distributor includes an auxiliary distributing valve having an operating rod inside said housing, said auxiliary valve being slidable for said auxiliary valve selectively to distribute fluid under pressure to the gear change servo mechanism and for said auxiliary valve to vent the fluid from the gear change servo mechanism to atmosphere, said valve having a spring biasing the same to the venting position thereof and being forced to the fluid supplying position by means of the piston when the latter takes position corresponding to disengaged position of the clutch.

12. Apparatus as set forth in claim 11, wherein said apparatus is adapted to control gear change electrovalves associated with the gear change servo mechanism, and said apparatus includes a slide having a biasing spring and an electric switch having an operating rod following a cam on the slide, said slide being actuated by said piston so that the electrovalves are energized when the clutch is disengaged.

13. Apparatus as set forth in claim 11, wherein said push rod, piston and piston rod are coaxial, and said piston rod and push rod extend from opposite ends of the housing.

References Cited in the file of this patent
UNITED STATES PATENTS

| | | |
|---|---|---|
| 2,753,024 | Weaving et al. | July 3, 1956 |
| 2,753,025 | Reis | July 3, 1956 |
| 2,763,350 | Klaue | Sept. 18, 1956 |
| 2,773,572 | Province | Dec. 11, 1956 |

FOREIGN PATENTS

| | | |
|---|---|---|
| 66,890 | Netherlands | Dec. 15, 1950 |